United States Patent [19]
Kreitzberg

[11] 3,873,135
[45] Mar. 25, 1975

[54] WAVEGUIDE BOOT

[75] Inventor: James S. Kreitzberg, Salem, Oreg.

[73] Assignee: Microflect Co., Inc., Salem, Oregon

[22] Filed: July 26, 1973

[21] Appl. No.: 382,757

[52] U.S. Cl............. 285/177, 285/137 R, 285/158, 285/236, 285/331, 285/419, 333/98 R
[51] Int. Cl.......................................... F16l 21/06
[58] Field of Search .......... 285/177, 236, 235, 373, 285/419, 331; 333/98 R; 24/25, 249 WL, 132 WL

[56] References Cited
UNITED STATES PATENTS

| | | | |
|---|---|---|---|
| 2,447,697 | 8/1948 | Gotschall | 285/235 X |
| 2,466,076 | 4/1949 | Bentley et al. | 285/236 X |
| 2,507,535 | 5/1950 | Madsen | 285/177 X |
| 3,133,753 | 5/1964 | Goodman et al. | 285/419 X |
| 3,327,211 | 6/1967 | Taub | 333/98 R X |
| 3,456,965 | 7/1969 | Gajewski et al. | 285/419 X |
| 3,472,536 | 10/1969 | Ingram | 285/177 |
| 3,512,805 | 5/1970 | Glatz | 285/331 X |
| 3,667,782 | 6/1972 | Viazzi | 285/373 X |

FOREIGN PATENTS OR APPLICATIONS

| | | | |
|---|---|---|---|
| 455,417 | 7/1968 | Switzerland | 285/331 |
| 544,979 | 5/1942 | Great Britain | 285/235 |
| 758,457 | 10/1956 | Great Britain | 333/98 R |

Primary Examiner—Thomas F. Callaghan
Attorney, Agent, or Firm—John D. Pope, III

[57] ABSTRACT

A waveguide boot for sealing the opening through which a microwave transmission line enters a structure such as a building includes a pair of boot segments pivotally movable with respect to each other. The waveguide boot, which is engageable with a waveguide entry member, also includes a key member insertable in key slots formed in each segment for locking the segments together. The boot segments are formed of resilient material and each have channel-like recesses shaped to conform to the contour of a microwave transmission line. In use the boot segments are pivoted to a closed position around the microwave transmission line whereby the channel-like recesses envelop the transmission line. The boot segments are then locked together by inserting the key member in the key slots. Clamps can be provided around the locked boot to compress it against the transmission line and the waveguide entry member which the boot engages.

10 Claims, 8 Drawing Figures

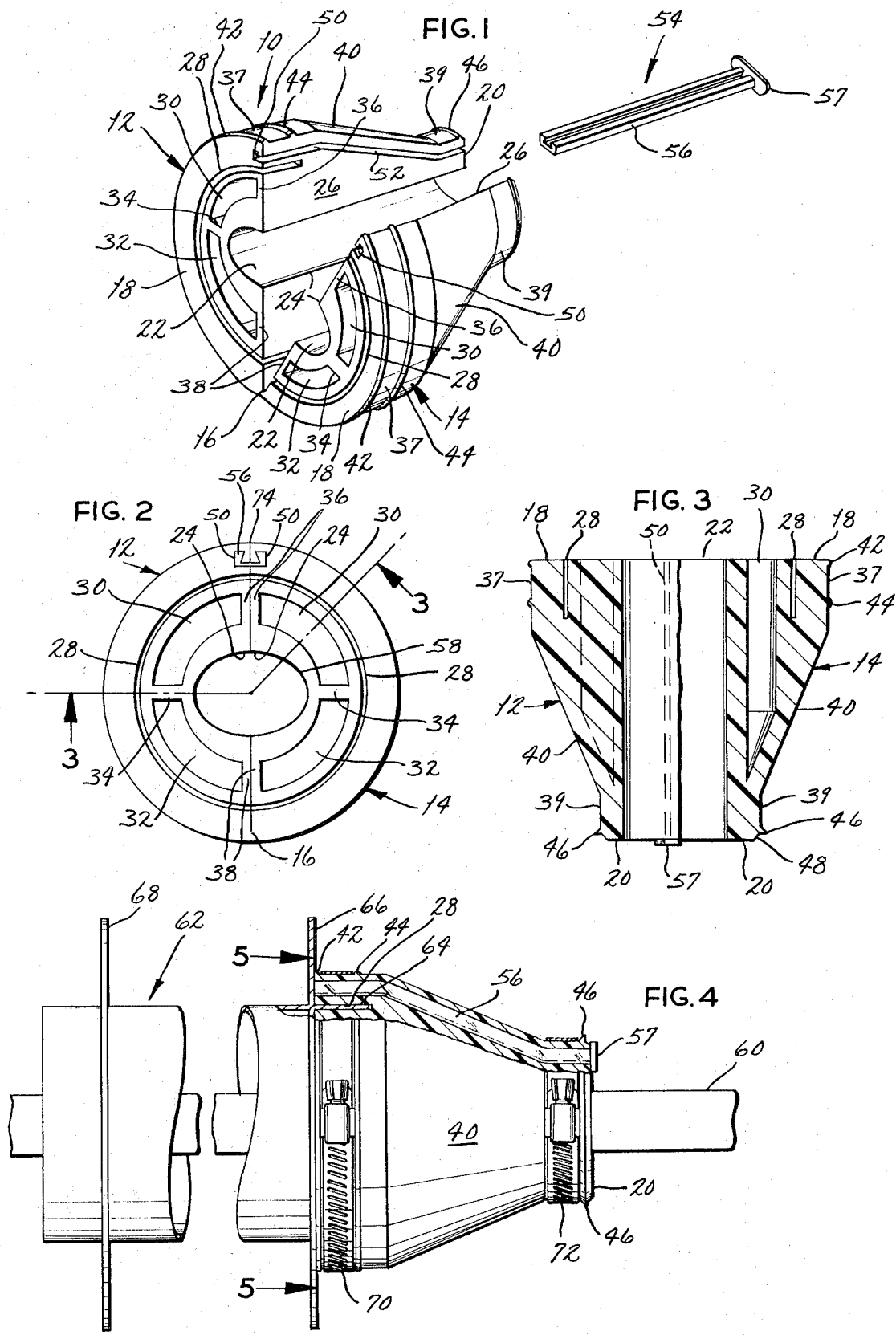

3,873,135

WAVEGUIDE BOOT

This invention relates to sealing devices and more particularly to a waveguide boot for sealing the opening through which a microwave transmission line enters a building or other structure.

A waveguide boot to shield such an opening is usually fitted on the transmission line or wave-guide by inserting the transmission line through the boot during the setup and installation of the transmission line. Under certain circumstances boot material is affected by ozone attack, sunlight aging, or extremes of heat and cold and must periodically be replaced. Such boot replacements may necessitate temporary shut down of the waveguide system.

Among the several objects of the present invention may be noted the provision of a novel wave-guide boot; a novel waveguide boot that can be either removed from, or newly installed on an existing microwave transmission line without interfering with the operation of the waveguide system; a novel waveguide boot that can be simply installed without sealing tape or other adhesive sealants; a novel waveguide boot that can flex slightly so that minor misalignments of transmission lines do not prevent obtaining a good seal; a novel waveguide boot that is tapered to shed water and retard ice and snow build up; and a novel waveguide boot of clam shell design that can be easily and quickly removed or installed. Other objects and features will be in part apparent and in part pointed out hereinafter.

The present invention relates to a novel waveguide boot for a microwave transmission line. In one embodiment the invention comprises a pair of boot segments hinged together at a junction portion of the segments. The boot segments when thus hinged can pivot with respect to each other in clam shell fashion. Each boot segment, which has oppositely disposed first and second base portions, includes elongated channels that extend from respective first base portions to respective second base portions of the segments. The waveguide boot further includes locking means in each segment for clamping the segments together. The locking means comprise a keyway portion in each segment and a single key member insertable in both keyway portions for locking the segments together so that pivotal movement of the segments is prevented. The elongated channel in each segment is disposed intermediate the junction portion and the keyway portions so that the elongated channels confront each other and form a closure when the segments are locked together.

The invention accordingly comprises the constructions hereinafter described, the scope of the invention being indicated in the following claims.

In the accompanying drawings, in which several of various possible embodiments of the invention are illustrated, FIG. 1 is an exploded perspective view of an unlocked waveguide boot incorporating one embodiment of the present invention;

FIG. 2 is an end view of the boot of FIG. 1 in locked position;

FIG. 3 is a sectional view thereof taken on line 3—3 of FIG. 2;

FIG. 4 is a side view partly shown in section of the waveguide boot assembled to a microwave transmission line and a microwave entry member;

Corresponding reference characters indicate corresponding parts throughout the several views of the drawings.

Figure 5:
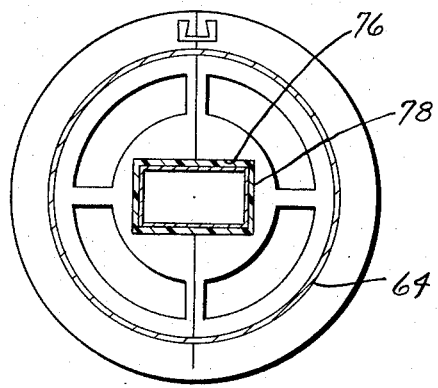
FIG. 5 is a sectional view taken on line 5—5 of FIG. 4 showing another embodiment of the present invention.

Referring now to the drawings, a microwave boot 10 incorporates one embodiment of the invention. Boot 10 comprises a pair of boot segments 12 and 14 hinged together at a junction portion 16 such that segments 12 and 14 can pivot with respect to each other in clam shell fashion. Junction 16 is essentially a continuation of boot material from segment 12 to segment 14. Segments 12 and 14 are formed in any suitable known manner such as by molding a suitable resilient material. I have found that a polyester such as polyurethane elastomer can be adequately molded to form the desired shape of boot 10, has the necessary resiliency characteristics, and is strongly resistant to ozone attack, sunlight aging, and extremes of heat and cold normally encountered in waveguide systems.

As segments 12 and 14 are each identical and symmetrically arranged segment 12 will be described in detail and such description is applicable to segment 14.

Segment 12 includes a major base portion 18 and a minor base portion 20. Segment 12 also includes an elongated channel 22 extending from major base portion 18 to minor base portion 20. An orifice 24 of channel 22 is at a surface 26 of segment 12.

Major base portion 18 of segment 12 includes a semicircular groove 28 spaced from and partially surrounding channel 22. Major base portion 18 also includes a pair of spaced identical recesses 30 and 32 formed intermediate channel 22 and semicircular groove 28. Recesses 30 and 32 are separated by a web portion 34. Recess 30 approaches but does not reach minor base portion 20. Web portions 36 and 38 are also provided intermediate surface 26 and recesses 30 and 32 respectively.

Segment 12 also includes a major clamping flange 37 extending around major base portion 18 from junction portion 16 to surface 26. A minor clamping flange 39 extends around minor base portion 20 from junction portion 16 to surface 26. A generally tapered peripheral portion 40 extends between major and minor clamping flanges 37 and 39 of segment 12.

Major clamping flange 37 includes spaced ribs 42 and 44 whereas minor clamping flange 39 includes a rib 46 spaced from the intersection of tapered periphery 40 and minor clamping flange 39. If desired, a similar rib (not shown) can be provided at this intersection. A tapered end portion 48 is provided intermediate minor base portion 20 and rib 46. Moreover, base portion 20 is slightly tapered in the same general direction as tapered portion 48 and tapered periphery 40.

Segment 12 also includes a key slot portion 50 which slot at base portion 18 is formed intermediate semicircular groove 28 and major clamping flange 37. Key slot portion 50 in cross-section is in the general shape of an L and extends through minor base portion 20. Key slot portion 50 also forms an open groove 52 at surface 26, groove 52 being generally parallel to major and minor flanges 37 and 39, and tapered periphery 40.

Boot 10 further includes a key member 54 also formed of any suitable resilient material such as a polyurethane elastomer. Key member 54 includes an elongated stem portion 56 which in cross-section is generally U-shaped, and a flange 57 provided at one end of stem 56. Stem portion 56 of key member 54 is insertable in key slot portion 50 of segment 12 and likewise insertable in key slot portion 50 of segment 14 to lock said segments together as shown in FIG. 2.

With segments 12 and 14 locked together by key member 54 surfaces 26 and 26 of segments 12 and 14 engage each other in substantial surface to surface contact. Thus orifices 24,24 of segments 12 and 14 confront each other to form an elliptically shaped closure 58. Semicircular grooves 28,28 in segments 12 and 14 form one continuous annular groove surrounding closure 58. Recesses 30,30,32,32 also surround closure 58. Corresponding base portions 18, 18 and 20,20 align to form oppositely disposed base surfaces of locked waveguide boot 10.

In use, waveguide boot 10 is fitted around a microwave transmission line 60 of complementary shape and size with closure 58 at a location where line 60 enters the wall of a building (not shown) or any other structure. Such entry is generally accomplished by providing a suitable waveguide entry member 62 at the building wall, for example. Waveguide entry member 62 is in the general shape of a hollow cylinder and comprises an engaging portion 64 at one end thereof projecting from a flange 66. Entry member 62 also includes a flange 68 spaced from flange 66 and is attached to the wall of a building (not shown) in any suitable known manner to permit line 60 to extend through said wall.

To install boot 10 around microwave transmission line 60 key member 54 is removed permitting segments 12 and 14 to be diverged from each other. Segments 12 and 14 are then pivoted together around line 60 such that channels 22,22 envelop line 60 and surfaces 26,26 contact each other. Key slot portions 50,50 in segments 12 and 14 are thus aligned with each other to permit insertion of key member 54 therein to lock said segments together. It should be noted that stem 56 of key member 54 will resiliently bend to conform to any bends in key slot 50. Flange 57 limits insertion of stem 56 in key slot portions 50,50 and also functions as a handle which can be gripped when removal of key member 54 from boot 10 is desired.

Boot 10 in its locked condition can then be slid along line 60 against entry member 62 until engaging portion 64 is fully inserted into annular groove 28,28 in major base portions 18,18. Boot 10 thus positioned collars line 60 and waveguide entry member engaging portion 64. Any suitable known clamping members such as adjustable stainless steel clamping members 70 and 72 provided at major and minor clamping flanges 37 and 39 respectively can be used to tighten boot 10 on engaging portion 64 and on line 60. Clamps 70 and 72 can be tightened a predetermined amount to cause boot 10 to compress slightly thereby hugging engaging portion 64 and line 60 and forming a seal therearound.

Should boot 10 be oriented so that minor base portions 20,20 face in an upward direction as in waveguide systems entering a building roof, the tapered surface at base 20, tapered portion 48 and tapered periphery 40 will tend to shed water and also retard any build up of ice and snow on boot 10. As key member 54 spans the open or split side 74 of segments 12 and 14 any moisture that enters split side 74 is trapped and can go no further than stem 56.

Figure 6:
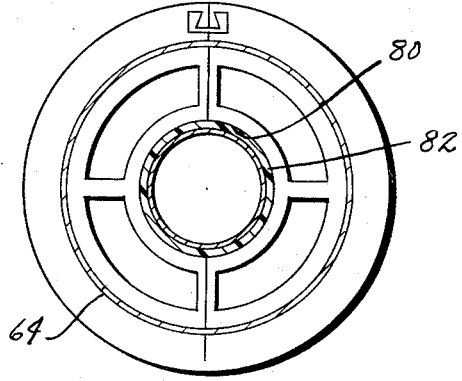
FIGS. 6–8 are views similar to FIG. 5 showing additional embodiments of the invention.

As mentioned, the seal between boot 10 and line 60 is accomplished in part by employing a boot having a closure of complementary size and shape with the microwave transmission line. Since microwave transmission lines are available in varying cross-sectional sizes and shapes, boots having the same general construction as boot 10 can be formed with closures of diverse size and shapes such as a rectangular closure 76 shown in FIG. 5 to accomodate a rectangular transmission line 78. Similarly, a circular closure 80, as shown in FIG. 6, accomodates a microwave transmission line 82 having a circular cross-section.

Figure 7:
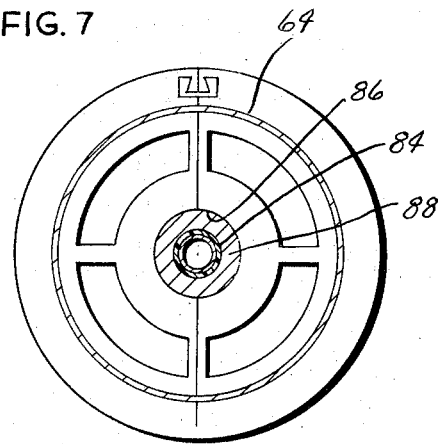

In the event there is a disparity between the size of the boot closure and the microwave transmission line such as shown in FIG. 7 wherein a line 84 is of substantially smaller diameter than a closure 86, any suitable filler material such as mastic tape 88 can be applied around line 84 to build up line 84 to conform to the size and shape of closure 86. The wave-guide boot can thereby form a seal around the built up line when secured therearound.

Figure 8:
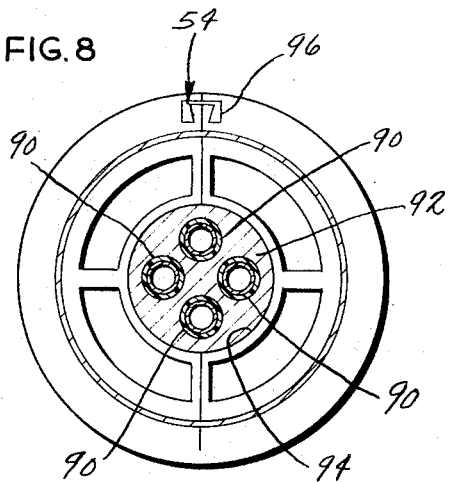

In the boot shown in FIG. 8 four microwave transmission lines 90,90,90 and 90 are built up with any suitable means such as mastic tape 92 to the desired size and shape complementary to a closure 94. The orientation of a key slot 96 in the boot of FIG. 8 is rotated 180° from that of key slot 50 in the boot of FIGS. 1-4 and suffices to maintain the FIG. 8 boot segments locked together when key member 54 is inserted therein.

As will be apparent to those skilled in the art, the external shape of waveguide boot 10 can be varied as desired. It will also be apparent that the key member and key slot portions formed in the boot segments can have other cross-sectional shapes as long as insertion of the key member in the key slot portion prevents pivotal movement of the boot segments. Waveguide boot 10 can also be made in a variety of colors as desired, such as for color coding the waveguide entries.

Some advantages of the present invention evident from the foregoing description are a waveguide boot that can be easily removed from, or installed on an existing transmission line without interfering with the operation of the waveguide system. Another advantage is a waveguide boot that can be positioned on a transmission line and clamped thereto without adhesives, tapes or other similar bonding means. A further advantage is a waveguide boot that can be constructed with closures of varying size that resiliently conform to the shape of the waveguide transmission line to obtain a seal therebetween. Still other advantages are a waveguide boot having pivoting segments that can be molded in one piece, and a waveguide boot that can flex and compress to obtain a good seal. Also the boot will not deteriorate in extreme weather conditions or on direct exposure to sunlight.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A waveguide boot for a microwave transmission line comprising first and second resilient boot segments having a junction portion whereat said segments are joined together for pivotal movement with respect to each other, each said boot segment having an outer perpheral surface oppositely disposed first and second base portions and axially extending side portions, said first and second segments each including an elongated channel extending from respective first base portions to respective second base portions, said waveguide boot further including locking means in each segment for clamping said segments together to prevent said pivotal movement, the elongated channel in each said segment being disposed intermediate said junction portion and the locking means in each said segment such that said segments when locked together cause said elongated channels to confront each other and said side portions of the segments to engage one another to form a closure, said locking means including a keyway comprising a keyway portion within each said segment at the edge of the segment remote from said junction portion, said locking means further including an elongated resilient key member having a stem portion insertable in said keyway portions for locking said segments together, said stem portion being disposed entirely within the outer peripheral surface of said boot segments, said stem portion and said keyway portions having interlocking means for holding said segments in engagement with one another.

2. A waveguide boot as claimed in claim 1 wherein said confronting elongated channels in cross-section form a closure of elliptical shape.

3. A waveguide boot as claimed in claim 1 wherein at least one of the base portions of each said segment align when said segments are locked together, said aligned base portions defining a boot base surface, said boot base surface including an annular groove surrounding said closure, said annular groove being engageable with a waveguide entry member having an engaging portion of complementary cross-sectional size and shape with said annular groove.

4. A waveguide boot as claimed in claim 3 wherein said boot includes a clamping flange at the periphery of said boot base surface, said boot further including a clamping member for disposition on said clamping flange to clamp said waveguide boot to said entry member when the engaging portion of said entry member is engaged with said annular groove.

5. A waveguide boot as claimed in claim 1 wherein corresponding base portions of each segment align when said segments are locked together to define opposing base surfaces of said boot, one of said boot base surfaces including at least one recess extending toward the other boot base surface.

6. A waveguide boot as claimed in claim 5 further including a plurality of said recesses surrounding said closure, said boot further including web portions separating said recesses from each other.

7. A waveguide boot as claimed in claim 1 wherein said keyway portions extend from respective first base portions to respective second base portions of said segments and said key member when inserted in said keyway portions extend the entire length of said keyway.

8. A waveguide boot as claimed in claim 1 wherein said key member includes a flange at one end thereof for abutment against one of said base portions when said key member is fully inserted in said keyway portions, said abutment preventing further insertion of said key member in said keyway.

9. A waveguide boot as claimed in claim 1 wherein each said keyway portion is generally L-shaped in cross-section, said key member being generally U-shaped in cross-section with spaced leg portions, each spaced leg portion of said U-shaped key member engaging a leg of each said L-shaped keyway portion when said segments are locked together by said key member.

10. A waveguide boot as claimed in claim 4 wherein said closure is arranged to envelop a microwave transmission line and said boot material is polyurethane, said boot material being compressible from its original outer dimension at said clamping flanges by said clamping members to maintain a seal around said microwave transmission line and the engaging portion of said waveguide entry member.

* * * * *